United States Patent [19]

Kolacek

[11] Patent Number: 4,877,359
[45] Date of Patent: Oct. 31, 1989

[54] ADJUSTABLE STOP MEMBER

[76] Inventor: Ivo Kolacek, 1004 S. Milwaukee, Wheeling, Ill. 60090

[21] Appl. No.: 82,329

[22] Filed: Aug. 6, 1987

[51] Int. Cl.⁴ .......................... B23B 49/00; B23C 1/06
[52] U.S. Cl. ...................................... 409/218; 279/15;
    408/14; 408/16; 408/241 S; 29/65
[58] Field of Search .............. 29/65; 409/218; 408/14,
    408/16, 241 S; 82/34 B, 34 C, 34 D; 279/1 S,
    46; 10/136

[56] References Cited
U.S. PATENT DOCUMENTS

| | | | |
|---|---|---|---|
| 971,679 | 10/1910 | Kirby | 10/136 R X |
| 2,365,196 | 12/1944 | Honegger | 29/65 X |
| 2,896,956 | 7/1959 | Ann | 279/46 |
| 3,037,405 | 6/1962 | Steyskal | 408/241 S |
| 3,555,964 | 1/1971 | Fleming | 407/54 X |
| 3,724,964 | 4/1973 | Needham, Jr. | 408/14 |
| 4,436,462 | 3/1984 | Martinez | 409/218 |
| 4,606,685 | 8/1986 | Maier et al. | 409/134 X |

Primary Examiner—Z. R. Bilinsky

[57] ABSTRACT

An adjustable stop member, comprises three parts which are mounted in longitudinal alignment, with the overall length of the aligned parts being adjustable. The first part is an elongate cylindrical member which has one closed end and a threaded, elongate bore extending inwardly from the other end. The second part is an elongate rod which has external threads for mutual engagement with the internal threads of the first part. The second part further has a flat extending longitudinally along the surface thereof and an index line extending longitudinally along the surface thereof and an index line extending along the length of the flat. The third part is a nut which is threaded on the second part. The nut can be tightened against the first part for firmly securing the parts together in a releasable, fixed position. The nut has equally spaced markings around its circumference which form a scale used with the index line on the second part in setting a desired overall length of the stop member. A mechanical holder system is also provided for holding the stop member in a desired position when used with a machining apparatus such as a drilling machine, a milling machine or a lathe.

16 Claims, 3 Drawing Sheets

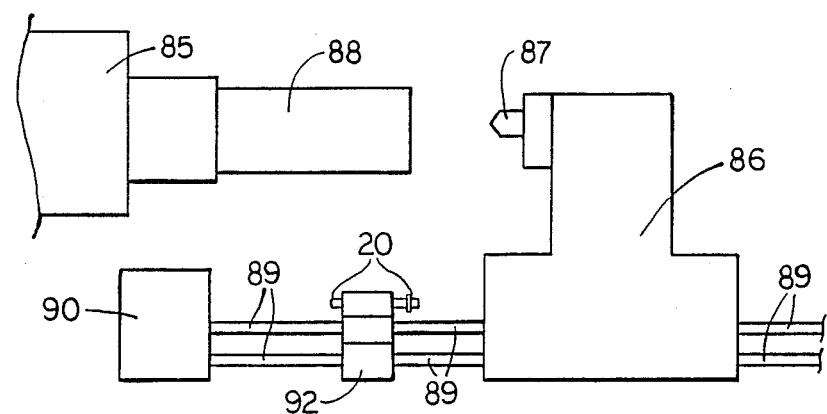
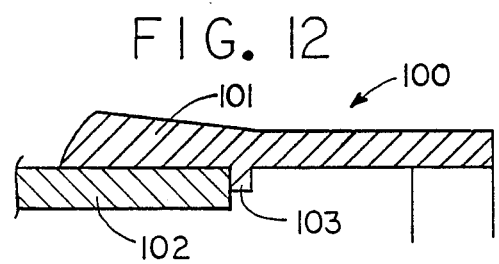
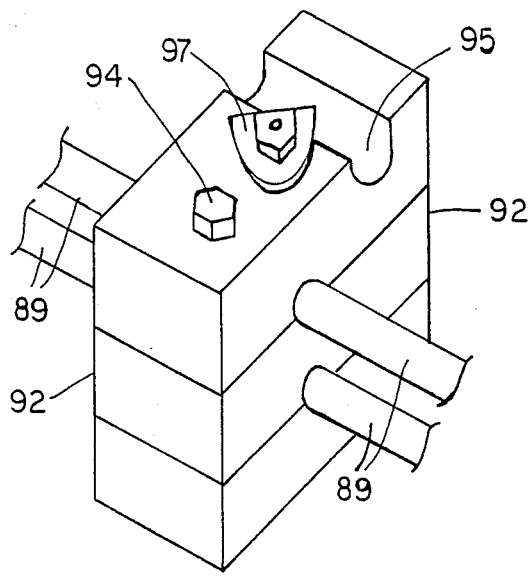

ADJUSTABLE STOP MEMBER

BACKGROUND OF THE INVENTION

1. Field of the Invention

The present invention relates generally to an adjustable stop member which is advantageously used with machines having a tool support structure, a tool mounted on the tool support structure, a work holder, means for producing relative movement between the tool support structure and the work holder, and stop means for limiting the relative movement between the tool support structure and the work holder. In particular, the invention relates to an inexpensive, adjustable stop member whose elongate dimension can be accurately adjusted in increments as small as 0.001 inch and which can be quickly and interchangeably positioned in the stop means of conventional machining apparatus such as drills, mills and lathes.

2. State of the Art

Various types of machining apparatus having a tool mounted in a tool support structure, a work holder and means for producing relative movement between the tool support structure and the work holder are well known in the art. Such machines include drills, mills and lathes, and these machines commonly have incorporated therein a stop means for limiting the relative movement between the tool support structure and the work holder. The stop means generally comprises a member which moves along a shaft or other tracking means. This movable member moves in a set proportion to the relative movement between the tool support structure and the work holder. Generally, the movable member of the stop means moves in an equal proportion with the relative movement between the tool support structure and the work holder.

By limiting the extent of movement of the movable member of the stop means, the extent or amount of relative movement between the tool support structure and the work holder can be controlled. Generally, the extent of the movement of the movable member is achieved by providing an adjustable means for limiting the sliding movement of the movable member along the tracking means. It is common to provide adjustable rings which can be releasably secured at any desired position along the tracking means. Movement of the movable member is then stopped at the desired extent thereof when the movable member impedes one of the rings. By proper adjustment of the position of the rings, the desired degree of relative movement between the tool support structure and the work support member is achieved.

The repositioning and adjustment of the components of the stop means in accordance with the prior art is both tedious and time consuming. In addition, the accuracy of successive and repetitive settings leaves much to be desired. It would be highly desirable to have a simple, reliable, inexpensive means for quickly and accurately setting and changing the limits of the relative movement between the tool support structure and the work support member.

Objectives

A principal objective of the invention is to provide a novel, generally inexpensive, readily adjustable, reliable stop member for use with machining apparatus having a tool support structure, a work holder and means for producing relative movement between the tool support structure and the work holder, whereby the stop member can be used to quickly and accurately set the limits of the relative movement between the tool support structure and the work holder.

A particular objective of the present invention is to provide such adjustable stop members which are readily positioned within the stop means of a drilling machine, a milling machine or a lathe to quickly and accurately set the depth of the machining for any particular application, and wherein a particular stop member can be readily removed and either adjusted itself or replaced with a substitute, previously adjusted stop member for another, different application.

Another objective of the present invention is to provide such adjustable stop members which are readily used to achieve a high degree of accuracy in repetitive machining operations involving either simple repetitive operations utilizing the same machine tool and same depth settings to produce multiple items of the same type, or more complex operations wherein the machine tools and/or the depth settings are changed during the operations to produce items of various types.

An additional objective of the present invention is to provide such adjustable stop members which are readily interchangeable in the stop means of a drilling machine, a milling machine or a lathe and which will greatly increase the general productivity of the machines with which the stop members are used by allowing fast, accurate conversion from one application to another on such machines.

A further objective of the present invention is to provide such adjustable stop members which are readily interchangeable in the stop means of a drilling machine, a milling machine or a lathe and which will allow accurate settings of as small as about 0.001 inch in the adjustment of the machining characteristics of such machines.

A still further objective of the present invention is to provide such adjustable stop members which further include means for positioning the stop members in the stop means of drilling machines, milling machines and lathes.

BRIEF DESCRIPTION OF THE INVENTION

The above objectives are achieved in accordance with the present invention by providing novel, unique, adjustable stop members for use with machines of the type having a tool support structure, a tool mounted on said tool support structure, a work holder, means for producing relative movement between the tool support structure and the work holder, such that the tool mounted on the tool holder can be brought into cutting contact with a work piece mounted on the work holder, and stop means for limiting the relative movement between the tool support structure and the work holder. Such machines include drilling machines, milling machines and lathes. The stop members of the present invention comprise elongate articles whose elongate dimension is adjustable in units as small as 0.001 inch. The stop members are adapted to be readily inserted lengthwise into the stop means of the respective machining apparatus to quickly and accurately set the cutting or machining characteristics of the machining apparatus. The stop members can further be readily exchanged to allow rapid conversion from a machining application involving one set of machining characteristics to another, separate application involving different machining characteristics and vice versa, with a very high degree of reproducibility of the items made during the respective, machining applications. In a preferred embodiment, there is also provided in combination with the stop member means for positioning the stop member in the stop means of the machining apparatus. The positioning means advantageously comprises a support arm mounted at one end thereof to the machining apparatus. Mounting means are provided at the other end of the support arm for holding the stop member in position in the stop means of the machining apparatus.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

FIG. 10 is a schematic representation of the use of the stop member of this invention in the stop means of a lathe;

FIG. 11 is a pictorial view of a holder member which can be used to hold the stop member in position when used with a lathe; and FIG. 12 is a partial cross-section through an improved collet used in the chuck of a milling machine, wherein the collet provides a reference point for placement of the tool relative to the adjustable stop member of the present invention.

DETAILED DESCRIPTION OF THE ILLUSTRATED EMBODIMENTS

Figure 1:
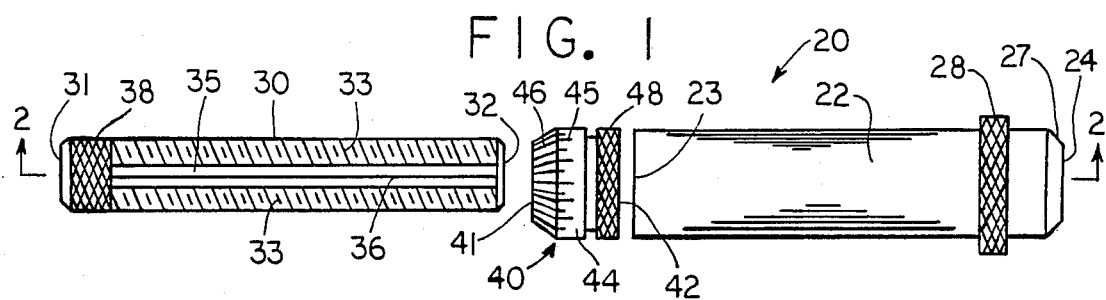
FIG. 1 is a plan view of a preferred embodiment of an adjustable stop member in accordance with the present invention showing the three major parts or pieces of the stop member in exploded relation to each other.
Figure 2:
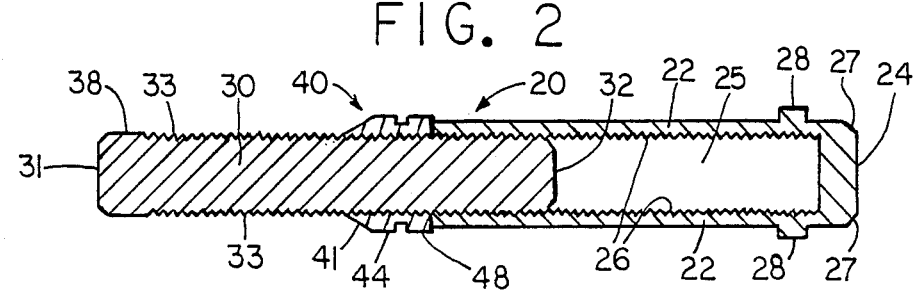
FIG. 2 is a cross section of the stop member of FIG. 1 taken along line 2—2 of FIG. 1 and showing the three parts or pieces of the stop member in an assembled position.
Figure 3:
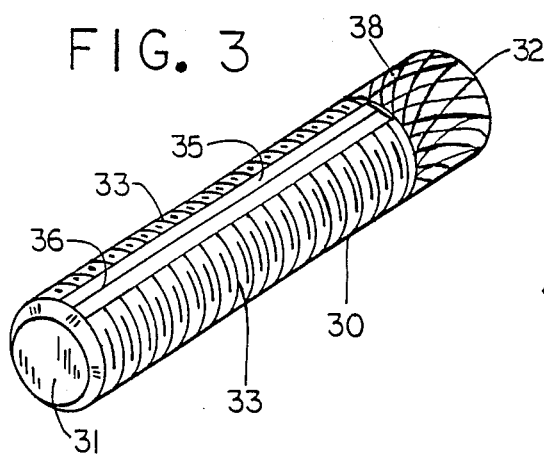
FIG. 3 is a pictorial representation of the solid, externally threaded, end piece of the stop member of FIG. 1.
Figure 4:
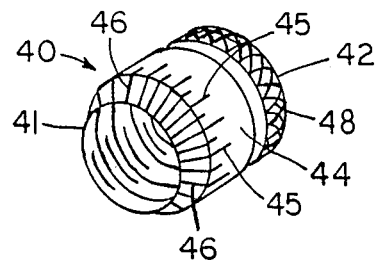
FIG. 4 is a pictorial representation of the internally threaded, intermediate piece of the stop member of FIG. 1.
Figure 5:
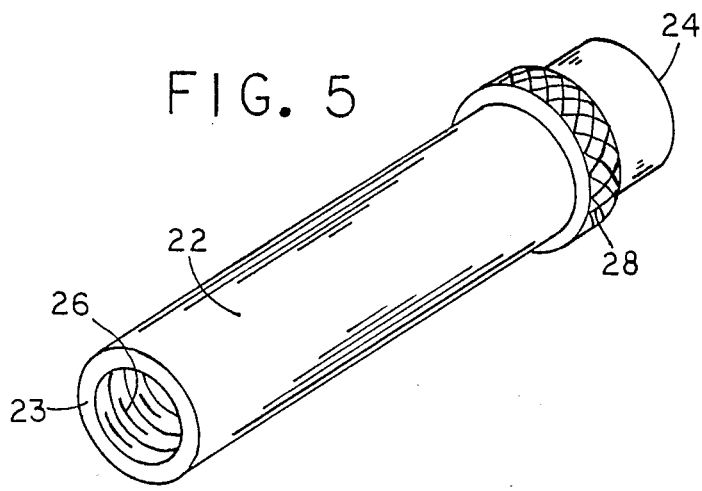
FIG. 5 is a pictorial representation of the internally threaded, end piece of the stop member of FIG. 1.

Referring to FIGS. 1-5, there is shown one specific embodiment of a novel, adjustable stop member of the present invention. The stop member is shown generally by the reference numeral 20. The stop member 20 comprises three major parts or pieces. The first part or piece forming the stop member 20 is an elongate, cylindrical member 22 which has a first end 23 and second end 24, respectively. An elongate bore 25 (FIG. 3) extends inwardly and coaxially from the first, open end 23 of the cylindrical member 22. The internal bore 25 is provided with internal, generally fine threads 26 along its longitudinal length. The second end 24 of the cylindrical member 22 is closed, and the flat, closed end is machined so as to be essentially perpendicular to the longitudinal axis of the cylindrical member 22. The juncture between the cylindrical side of the cylindrical member 22 and the flat, second end 24 is preferably formed by a chambered section 27 machined into the perimeter of the closed, second end 24. A relatively narrow, raised circumferential band 28 is provided on the cylindrical member 22, with the raised band 28 being positioned at least about twice as far or greater from the first end 23 of the cylindrical member 22 than from the second end 24. Preferably, the raised band 28 has a width of between about 4 and 10 millimeters, and for ease in handling the cylindrical member 22, the surface of the raised band 28 is advantageously knurled.

The second part or piece forming the stop member 20 is an elongate, rod 30 which has flat first and second ends 31 and 32. A threaded section 33 is formed along the longitudinal length of the elongate rod 30, with the threaded section 33 comprising external, generally fine threads which extend from the first end 31 along at least the major portion of the longitudinal length of the elongate rod 30. Preferably, the threaded section 33 extends along at least about three-fourths of the length of the elongate rod 30. The threaded section 33 of the elongate rod 30 is receivable within the elongate bore 25 of the cylindrical member 22 for making engagement with the internal threads of the elongate bore 25, such that the threaded section 33 of the elongate rod 30 can be adjustably advanced into and withdrawn from the elongate bore 25 in the cylindrical member 22 to thereby adjustably vary the effective, combined, longitudinal length of the cylindrical member 22 and the elongate rod 30 threaded therein.

The third part or piece forming the stop member 20 is a nut 40 having a first end 41 and a second end 42. The nut 40 is threaded on the threaded section of the elongate rod 30 such that the first end of the nut 40 faces the first end of the elongate rod 30 when the nut 40 is fully threaded on the threaded section 33 of the elongate rod 30. When the threaded section 33 is threaded into the first end of the cylindrical member 22, the nut 40 can be threaded tight against the first end 23 of the cylindrical member 22 to lock the elongate rod 30 and the cylindrical member 22 in a releasably, fixed position relative to each other. The effective overall length of the stop member 20 can be quickly and easily adjusted by simply unthreading the nut 40, threading or unthreading the rod 30 to achieve the desired length of the combined rod 30 and cylindrical member 22 and then rethreading the nut 40 tight against the first end 23 of the cylindrical member 22 to hold the rod 30 and the cylindrical member 22 in the new, desired, overall length.

The stop member 20 is advantageously made so that the effective, overall length can be accurately adjusted to any desired setting with a reproducible accuracy as small as 0.001 inch. This is achieved by providing in combination with the fine threads of the rod 30 and cylindrical member 22, a scale means for accurately and visibly adjusting the position of the rod 30 relative to the cylindrical member 22. The scale means preferably comprises an elongate, relatively narrow, linear flat 35 formed along the length of the threaded section 33 of the elongate rod 30. The flat 35 is formed at least as deeply into the surface of the elongate rod 30 as are the deepest portions of the threads, so that the flat 35 is essentially smooth and shows no thread lines extending transversely thereacross. An index line 36 is provided on the flat 35, with the index line 36 extending along the length of the flat 35 and being parallel to the longitudinal axis of the elongate rod 30. Preferably, the index line 36 is engraved into the surface of the flat 35.

The scale means further comprises a circumferential band 44 which is adjacent to the first end of the nut 40. The band 44 is polished, and equally spaced markings 45 are provided along the circumferential length of the polished band 44 on the nut 40. The markings 45 are preferably engraved into the surface of the polished band 44. The markings 45 form a scale which extends around the length of the band 44. The markings 45 forming the scale on the nut 40 are used in combination with the index line 36 on the elongate rod 30 to accurately adjust and reproduce desired settings of the overall length of the cylindrical member 22 and elongate rod 30. In the preferred, illustrated embodiment of the stop member 20, the first end of the nut 40 is chamfered, with the chamfered end being polished and having markings 46 engraved therein corresponding to the markings 45 in the polished band 44 which is immediately adjacent to the chamfered end 41.

In the preferred, illustrated embodiment of the stop member 20, a knurled band 48 is formed adjacent to the second end 42 of the nut 40, and a circumferential groove 49 is formed in the nut 40 between the polished band 44 and the knurled band 48. The knurled band 48 and the groove 49 are advantageously provided for ease in handling the nut 40. A knurled band 38 is also advantageously formed adjacent to the second 32 of the elongate rod 30 as an aid in handling the rod 30. The knurled band 38 preferably has a width of between about 45 millimeters and 15 millimeters, with the threads of the threaded section 33 extending from the first end 31 of the rod 30 to the knurled band 38.

Figure 6:
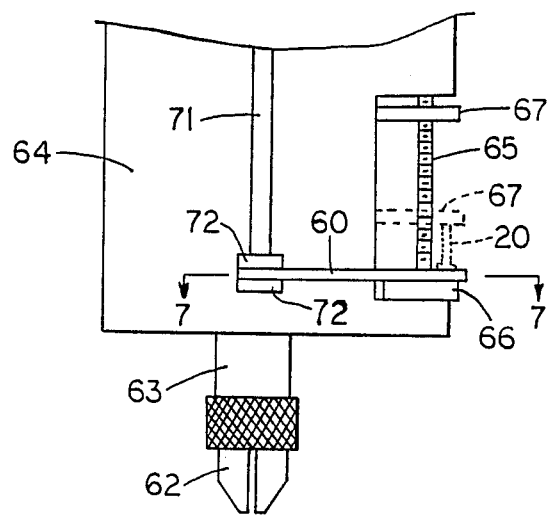
FIG. 6 is a schematic representation of machining apparatus such as a drilling machine or milling showing the conventional stop means on such apparatus and a holder means for positioning the stop member of this invention in the stop means of the machining apparatus.
Figure 7:
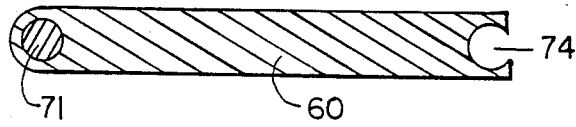
FIG. 7 is a cross-sectional view taken generally along line 7—7 of FIG. 6 of one preferred embodiment of a stop member holder means for positioning the stop member in the stop means of the machining apparatus.
Figure 9:
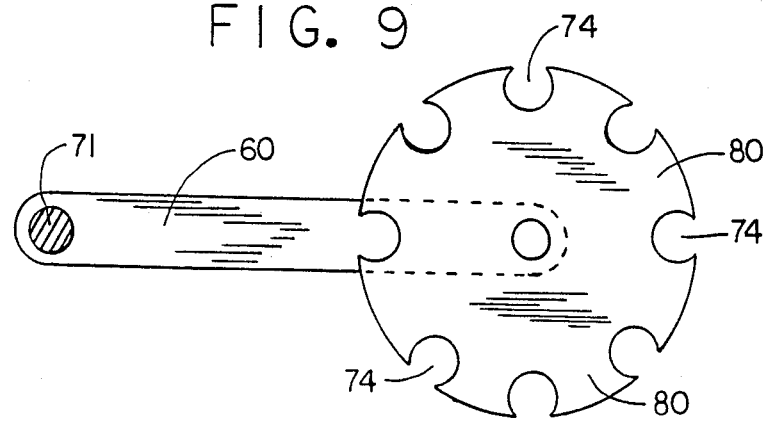
FIG. 9 is a plan view similar to the cross-sectional view of FIG. 7, but showing another preferred embodiment of a stop member holder means for positioning the stop member in the stop means of the machining apparatus.

The adjustable stop member 20 of the present invention is preferably provided with a means for positioning the stop member 20 within the stop means of the machining apparatus with which the stop member 20 is to be used. In FIGS. 6-7 of the drawings, there is shown two preferred embodiments of such means for use with milling or drilling machines. In FIGS. 9 and 10, a preferred embodiment of the positioning means is illustrated for use with a lathe.

The positioning means used with the milling and drilling machines, as shown diagrammatically in FIGS. 6-9, generally comprise a support arm 60 which is mounted at one end thereof to the drilling or milling machine. The support arm 60 extends to a position in which the free end thereof is positioned adjacent to the stop means of the machine. Mounting means are provided at the free end of the support arm 60 for holding the stop member 20 in position in the stop means of the machine.

As illustrated in FIG. 6, the chuck 62 of the milling or drilling machine is positioned at the end of a piston or shaft 63 which moves longitudinally, inwardly and outwardly of a housing 64. In conventional manner, the housing 64 has a rectangular recess formed therein comprising the stop means of the machine. The stop means includes a vertical shaft 65 generally extending from the top to the bottom of the rectangular recess. The shaft 65 is generally threaded, and an adjustable ring 66 is provided on the lower portion of the shaft 65. The ring 66 is internally threaded and can, therefore, be raised and lowered on the shaft 65. An upper disk or ring 67 is positioned above the first ring 66, with the upper ring 67 moving upwardly and downwardly on the shaft 65 in cooperation with the piston 63 and chuck 62. The chuck 62 moves the same amount as the upper disk or ring 67 Thus, the movement of the chuck 62 can be limited by limiting the movement of the disk or upper ring 67. As a general procedure, the lower ring 66 can be positioned at any desired setting so as to thereby limit the downward movement of the upper ring 67 and accordingly, the downward movement of the chuck 62. As mentioned earlier, however, the setting and resetting of the lower ring 66 is tedious, time consuming and subject to a high degree of inaccuracy.

In accordance with the present invention, the adjustable stop member 20 is provided as described hereinabove. The adjustable stop member 20 is easy to use, it is quickly changed, and it can readily be adjusted to exact dimensions which have a degree of accuracy exceeding 0.001 inch. In use with milling and drilling machines, the adjustable stop 20 is placed in the stop means of the machine. A stop member 20 is shown in phantom in FIG. 6. The stop member 20 limits the movement of the upper ring 67 and, thus, provides exact, reproducible control over the limit of movement of the chuck 62. The stop member 20 can be positioned manually within the stop means of the milling or drilling machine. However, it is highly desirable to provide means for mechanically positioning and holding the stop member 20 in place.

Particularly preferred means of mechanically positioning the stop member 20 are shown in FIGS. 6-9. As mentioned above, a support arm 60 is mounted at one end to the milling or drilling machine. This is advantageously done by providing a generally vertical support 71 which is attached to the drilling or milling machine at an appropriate position (the attachment of the support 71 is not shown in the drawings). The support arm 60 is rotatively mounted to the lower end of the vertical support 71. This can be readily accomplished by mounting the support arm 60 on the end of the vertical support 71 for rotational movement in a plane of the support arm. A pair of bushings 72 can be used to retain the support arm 60 on the end of the vertical support 71.

Figure 8:
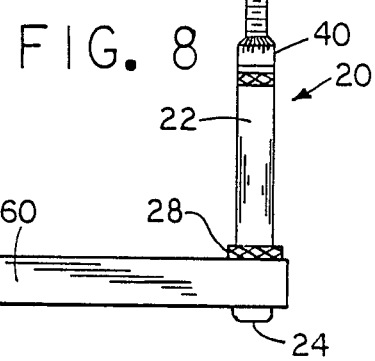
FIG. 8 is a partial elevation of the free end portion of the stop member holder means of FIG. 7 showing the stop member in position in the holder means.

A generally circular opening 74 is provided at the free end of the support arm 60. The opening 74 has a diameter just sufficient to receive the closed end portion of the cylindrical member 22 of the stop member 20. The raised band 28, as best seen in FIG. 8, rests on the upper surface of the support arm 60. The raised band 28 is spaced from the end 24 of the cylindrical member 22 of the stop member 20 by a sufficient distance so that the end 24 just protrudes from the bottom of the opening 74 in the support arm 60.

The support arm 60 is adapted to rotate about its pivotal connection to the vertical support 71, so that the free end thereof carrying the stop member 20 can be moved toward the stop means on the drilling or milling machine to position the stop member 20 as shown in phantom in FIG. 6. Then as the chuck 62 and the upper ring 67 of the stop means on the machine move downwardly, the upper ring 67 of the stop means contacts the upper end of the stop member 20 and thus limits the downward movement of the chuck 62. Generally, the adjustable ring 66 is positioned at its lowermost position, and the stop member 20 of this invention is used to set the limit of the downward movement of the upper ring 67. However, it is to be recognized that the adjustable ring 66 could be positioned in a selected, raised position just as well, with the stop member 20 of this invention positioned above the adjustable ring 66 to set the final limit of the movement of the upper ring 67. When the overall length of when the length of the one stop member 20 is to be readjusted, the support arm 60 is readily pivoted away from the stop means of the drilling or milling machine and the stop members are then exchanged in the open receptacle 74 in the free end of the support arm 60 or the one stop member 20 is removed, readjusted in overall length and then replaced.

A preferred embodiment of a modified means for positioning the stop member 20 in the stop means of a drilling or milling machine is shown in FIG. 9. The support arm 60 is again pivotally attached to the vertical support 71, but a rotating carousel 80 is provided at the free end of the support arm 60. The rotating carousel 80 comprises a circular disk that is pivotally mounted to the end of the support arm 60 for rotational movement about the central axis of the disk. A plurality of circular openings 74 are spaced around the perimeter of the carousel 80. The carousel 80 is, thus, adapted to hold a plurality of stop members 20 of this invention which have been adjusted to different overall lengths. When a stop member of a different length is to be used, the support arm 60 is pivoted away from the stop means on the drilling or milling machine, the carousel 80 is rotated to bring the desired stop member into operable position and the support arm is pivoted back towards the stop means on the drilling or milling machine to properly position the selected stop member in the stop means of the machine.

It has been found advantageous to provide the chucks of milling and drilling machines with an improved collet which provides a reference point for placement of the cutting tool relative to the adjustable stop member of the present invention. As shown in FIG. 12, the improved collet comprises collet members 100 which include the conventional engagement arms 101 which are wedged down or otherwise tightened upon the tool 102. In the improved collet, an abrupt, squared lug 103 is provided on the face of the collet members 100 which contact the surface of the tool 102. The tool is placed in the chuck with its inner end in engagement with the lug 103 on the collet members 100. This provides for accurate placement of the tool 102 relative to the milling machine and adjustable stop member 20 of the present invention.

As mentioned previously, the stop member 20 of the present invention is advantageously used with lathes as well as milling and drilling machines. A schematic representation of a lathe and the use of the stop member 20 with the lathe is shown in FIG. 10. The lathe conventionally comprises a work holder 85 and a tool carriage 86. The tool carriage 86, containing a cutting tool 87, is adapted to move toward the work holder 85 so as to bring the cutting tool 87 into working contact with the workpiece 88. The carriage 86 moves along a track means which as illustrated comprises a pair of parallel shafts 89.

The stop member 20 of the present invention can be manually positioned between the carriage 86 and the end abutment 90 supporting the ends of the track means or shafts 89 or an adjustable stop supported on the track means to limit the movement of the carriage toward the work holder 85 and workpiece 88. However, it is very advantageous to provide a mechanical means for positioning the stop member 20 between the carriage and the end abutment 90. As illustrated, the mechanical means conveniently comprised a slide member 92 which is adapted to slide back and forth along the track means between the abutment 90 and the carriage 86. As best shown in FIG. 11, the slide member 92 can include three mating sections which are adapted to fit around the pair of shafts 89 for sliding movement therealong. The three mating sections of the slide member 92 can be held together by a bolt 94. The upper surface of the slide member 92 is provided with an elongate slot 95 whose longitudinal axis is parallel to the track means or shafts 89. The slot 95 has a generally circular-shaped cross section which is adapted to receive the stop member 20 of the present invention such that the opposite ends of the stop member 20 extend from the slot 95 in the slide member as shown in FIG. 10. A spring clip or similar member 97 can be provided on the upper surface of the slide member 92 to retain the stop member 20 in position in the slot 95.

Although preferred embodiments of the stop member 22 and means for positioning the stop member 20 have been illustrated and described, it is to be understood that the present disclosure is made by way of example and that various other embodiments are possible without departing from the subject matter coming within the scope of the following claims, which subject matter is regarded as the invention.

We claim:

1. An adjustable stop member for use with machines having a tool support structure, a tool mounted on said tool support structure, a work holder, means for producing relative movement between the tool support structure and the work holder, such that the tool mounted on the tool holder can be brought into cutting contact with a work piece mounted on the work holder, and stop means for limiting the relative movement between the tool support structure and the an elongate, cylindrical member having first and second ends and an elongate bore which is coaxial with a longitudinal axis of said cylindrical member, said elongate bore extending inwardly from the first end of said cylindrical member;

internal threads along the length of said elongate bore;

an elongate rod having first and second ends;

a threaded section formed along the longitudinal length of said elongate rod, said threaded section comprising external threads which extend from the first end of said elongate rod along at least the major portion of the length of said elongate rod, with the threaded section of said elongate rod being receivable within said elongate bore in said cylindrical member for making engagement with the internal threads of said elongate bore such that the threaded section of said elongate rod can be adjustably advanced into and withdrawn from the elongate bore in said cylindrical member to thereby adjustably vary the effective, combined, longitudinal length of the cylindrical member and the elongate rod threaded therein;

an elongate, relatively narrow, linear flat formed along the length of the threaded section in said elongate rod, said flat being formed at least as deeply into the surface of the elongate rod as are the deepest portions of the threads;

an index line on said flat, said index line extending along the length of said flat and being parallel to the longitudinal axis of said elongate rod;

a nut having first and second ends is threaded on the threaded section of said elongate rod such that the first end of said nut faces the first end of said elongate rod when the nut is fully threaded on the threaded section of said elongate rod;

a circumferential band adjacent to the first end of said nut, said band being polished; and equally spaced markings along the circumferential length of the polished band on said nut, said markings forming a scale which extends around the length of said band, whereby, when the threaded section of the elongate rod is threaded into the first end of said cylindrical member, the scale on the nut and the index line on said flat of said elongate rod can be used to accurately adjust the overall length of the cylindrical member and elongate rod, and the nut can further be tightened against the first end of said cylindrical member to firmly secure the elongate rod and the cylindrical member in a releasably, fixed position relative to each other, and the stop member, comprising the elongate rod and the cylindrical member, can then be positioned in the stop means of said machine to limit the distance within which the tool support structure and the work holder can approach each other during use of said machine.

2. An adjustable stop member in accordance with claim 1, wherein the second end of said cylindrical member is closed, with the closed second end of said cylindrical member being substantially perpendicular to the longitudinal axis of said cylindrical member.

3. An adjustable stop member in accordance with claim 1, wherein the threaded section on said elongate rod extends along at least about three-fourths of the length of said elongate rod.

4. An adjustable stop member in accordance with claim 3, wherein a knurled band is formed adjacent to the second end of said elongate rod, with the knurled band having a width of between about 5 and 15 millimeters and with the threads of said threaded section extending from the first end of said elongate rod to the knurled band.

5. An adjustable stop member in accordance with claim 1, wherein said index line is engraved in the surface of the flat on the elongate rod.

6. An adjustable stop member in accordance with claim 1, wherein the nut has a cylindrical outer surface and the markings on the polished band of said nut are engraved in the surface of the polished band.

7. An adjustable stop member in accordance with claim 6, wherein the first end of said nut is chamfered, with the chamfered end being polished and having markings engraved therein corresponding to the markings in the polished band adjacent to said chamfered end.

8. An adjustable stop member in accordance with claim 7, wherein a knurled band is formed adjacent to the second end of said nut.

9. An adjustable stop member in accordance with claim 8, wherein a circumferential groove is formed in the nut between the polished band and the knurled band thereon.

10. An adjustable stop member in accordance with claim 1, wherein said cylindrical member is further provided with a relatively narrow, raised, circumferential band, said raised band being positioned at least about twice as far from the first end of said cylindrical member than from the second end of said cylindrical member.

11. An adjustable stop member in accordance with claim 10, wherein said raised band has a width of between about 4 and 10 millimeters, and further, wherein the surface of the raised band is knurled.

12. An adjustable stop member in accordance with claim 1, wherein there is further provided means for positioning said stop member in the stop means of said machine.

13. An adjustable stop member in accordance with claim 12, wherein said means for positioning said stop member in the stop means of said machine comprises
a support arm which is mounted at one end thereof to said machine and extends to a position in which the free end thereof is positioned adjacent to the stop means of said machine; and
mounting means at the free end of said support arm for holding the stop member in position in the stop means of said machine.

14. An adjustable stop member in accordance with claim 13, wherein said support arm is mounted for pivotal movement about its one end, so that the free end thereof can be rotated away from said stop means of said machine to accommodate installation or removal of said stop member from the mounting means at the free end of said support arm.

15. An adjustable stop member in accordance with claim 12, wherein said means for positioning said stop member in the stop means of said machine comprises
a support member which is mounted to said machine and has a pivotal connector means associated therewith, said connector means being positioned adjacent to the stop means of said machine;
a carousel rotatably mounted to the pivotal connector means of said support member; and
a plurality of mounting stations equally spaced about the perimeter of said carousel, with each mounting station being capable of having a stop member mounted therein,
whereby the carousel can be rotated so as to sequentially position the mounting stations with respective stop members, one at a time, in said stop means.

16. An adjustable stop member in accordance with claim 1 wherein there is further provided means for accurately positioning the cutting tool, said means comprising
a chuck comprising collet members which are tightened upon the tool; and
a lug provided on at least one of the collet members, said lug being on the face of the collet member which contacts the surface of the tool, such that the tool can be placed in the chuck with its inner end in engagement with the lug on the collet member.

* * * * *